Dec. 9, 1958   W. F. KING   2,864,015
ELIMINATION OF COOLING LIQUID DRAG
IN EDDY CURRENT DEVICES
Filed Jan. 24, 1956   3 Sheets-Sheet 1

INVENTOR.
WILLIAM F. KING
BY
ATTORNEYS

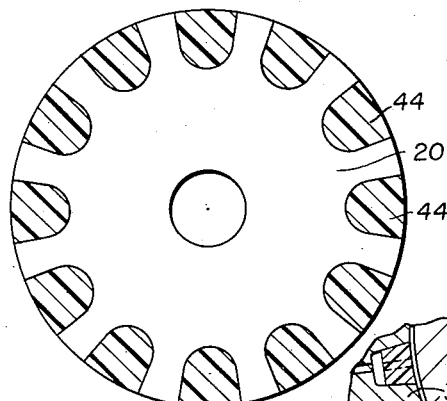
Fig. 2
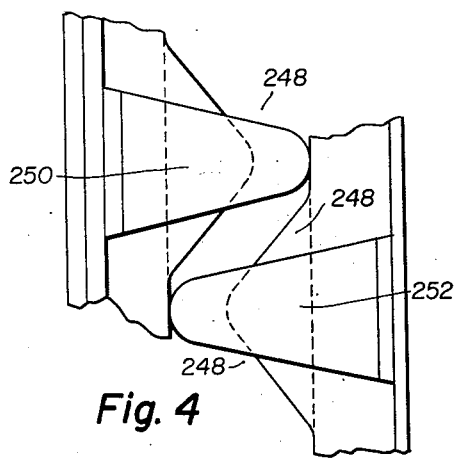
Fig. 3
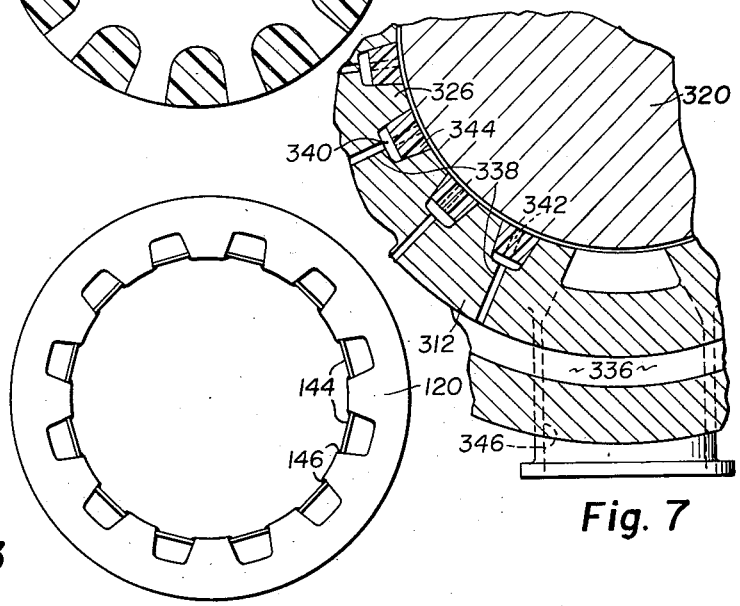
Fig. 7
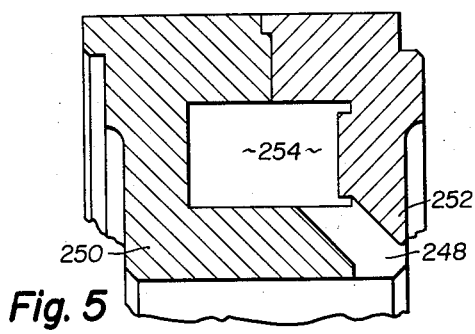
Fig. 4
Fig. 5
INVENTOR.
WILLIAM F. KING
BY
McDonald & Teagno
ATTORNEYS Dec. 9, 1958

W. F. KING 2,864,015

ELIMINATION OF COOLING LIQUID DRAG
IN EDDY CURRENT DEVICES

Filed Jan. 24, 1956

INVENTOR.
WILLIAM F. KING
BY McDonald & Teagno
ATTORNEYS

United States Patent Office 2,864,015
Patented Dec. 9, 1958

2,864,015

ELIMINATION OF COOLING LIQUID DRAG IN EDDY CURRENT DEVICES

William F. King, Wauwatosa, Wis., assignor to Eaton Manufacturing Company, Cleveland, Ohio, a corporation of Ohio Application January 24, 1956, Serial No. 561,059

3 Claims. (Cl. 310—93)

The present invention relates to a liquid drag reduction on pole carrying members of eddy current devices and more particularly to clutches, brakes and dynamometers of the eddy current type.

In the liquid cooling of eddy current devices of this type, the objectionable feature of excessive drag between the drum and rotor is presented when the liquid coolant is introduced. Due to the toothed structure of the rotor, varying amounts of liquid become temporarily trapped between each individual toothed portion of the rotor. The trapped portions of liquid do not remain static in each recess between the teeth, but move from recess to recess which results in a surge each time liquid is moved from one recess to the next. These surges of liquid, in addition to uneven distribution and the inherent turbulence in the liquid when moving in such an enclosure, cause undesirable variations in the angular velocity of the rotating members and considerable drag resulting in a material reduction in efficiency of the eddy current device. This condition can be remedied by filling or substantially filling the recessed portions between adjacent rotor teeth with a non-magnetic metallic or non-metallic material which serves to present a substantially smooth surfaced rotor member to the circumferentially adjacent rotating member of the eddy current device.

Among the principal objects of this invention is the provision of an eddy current device which is liquid cooled and has a very low drag loss due to the liquid.

Another object is to eliminate or greatly reduce fluctuations in the angular velocity of the rotating members due to surging or slugging of the liquid coolant.

Still another object is to more evenly distribute the liquid coolant which results in more effective cooling.

Another object is to provide an arrangement whereby the coolant is moved at a more uniform velocity over the rotating members due to the smooth surfaces which results in more effective cooling.

Yet another object is to reduce the noise level of the eddy current device during operation.

These and other objects and advantages will become more apparent from the following detailed description of the device and from the accompanying drawings.

In the drawings—

Figure 2 is an end view of a rotor similar to the rotor shown in Figure 1.

Figure 3 shows a modification of the invention applied to an internal tooth type pole carrying rotor.

Figures 4 and 5 show another modification of the invention utilizing interdigitated type pole teeth on the pole carrying rotor member.

Figures 6 and 7 show another modification of the invention embodied in a dynamometer.

Figure 1:
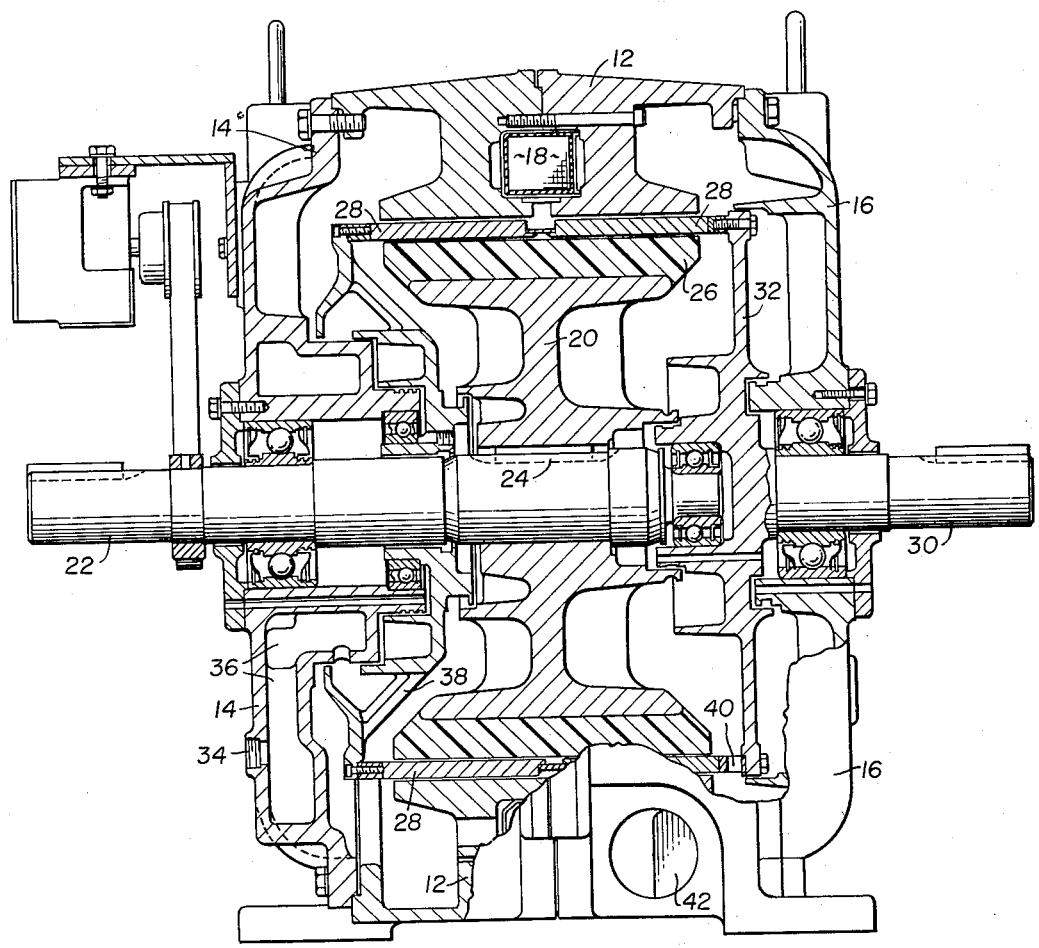
Figure 1 shows a side view of an eddy current clutch in which one embodiment of the present invention is utilized.

Referring to the drawing for a detailed description of the device, Figure 2 shows an end view of the rotor shown in Figure 1 in which the invention could be utilized.

A field housing assembly 12 is fixed to stationary end bell housing portions 14 and 16 and a field coil 18 is carried by the field housing assembly. A clutch rotor assembly 20 is attached to shaft 22 for rotation therewith, by key and keyway 24 and is concentrically mounted within the field coil assembly 12. The clutch rotor assembly 20 has integrally mounted thereon radially directed toothed pole members 26 which extend throughout the periphery of rotor 20.

Interposed between rotor 20 and field housing assembly 12 is an armature drum 28 which is formed as a sleeve member and is attached to shaft 30 through the armature drum support 32. Suitable air gaps are present between the rotor and armature and between the armature and the field coil assembly. The shafts 22 and 30 are journaled in the end bell housing portions by conventional ball bearing means.

When the field coil 18 is energized and the shaft 30 is rotated, eddy currents are generated and the clutch rotor is driven at a speed slightly less than the speed of the driving drum 28. This eddy current type operation is well known in the art and does not constitute a part of the present invention.

In the operation of an eddy current type clutch, dissipation of generated heat is accomplished by air or liquid cooling with the latter obviously rendering more desirable results. However, when liquid is fed across the toothed rotor member, slugging, cavitation and undesirable turbulence of the liquid takes place and movement of the liquid from one tooth to the adjacent one causes variations in the angular velocity of the rotor, hence, a great amount of drag between the armature sleeve and the rotor.

This difficulty is overcome in the present invention by filling or almost filling the spaces between rotor teeth with any suitable non-magnetic material which will adhere to the adjacent tooth surfaces and is capable of being smoothed to a desirable surface, or by providing a surface closure of the openings between the teeth by suitably attaching a strip of non-magnetic material between the teeth as shown in Figure 3.

The only characteristics required of the material are that it be relatively non-magnetic and it is desirable that it have a high heat distortion point and in some applications be fairly light in weight so as not to increase the inertia effect of the pole carrying member. Materials which can be used are plastic, stainless steel and aluminum, among others.

When the spaces between teeth are filled with the non-magnetic material, the torque fluctuations and drag are greatly reduced and a much more desirable operation is effected.

If so desired, the peripheral surface of the added non-magnetic material can be scored or grooved to provide small grooves offering the least amount of drag when liquid filled but provided to insure a sufficient amount of cooling liquid and the necessary circulation of the cooling liquid. Another expedient would be to not quite fill the recesses between teeth.

The cooling is accomplished in the illustrated device by injecting liquid, such as water, into the cooling inlet opening 34, passing the water through the path 36, the opening 38, across the clutch rotor assembly and armature drum and through the armature drum drain hole 40 to the outlet 42.

Figures 1 and 2 show a rotor having radially directed teeth having the space between the teeth filled with a suitable material 44 such as plastic. Figure 2 shows the filling material arranged so that the ends of the pole teeth and the peripheral surface of the filling material form a smooth arcuate surface.

Referring to the modification shown in Figure 3, the rotor 120 is similar to that shown in Figures 1 and 2, but is of the internal tooth type. This type rotor is used where the armature sleeve is mounted internally of the poled rotor. It is to be understood that either the solid filling between teeth or the strip closing, about to be described, can be used either on an internal toothed or external toothed type rotor.

In Figure 3, strips of a suitable non-magnetic material such as a plastic, non-magnetic stainless steel or aluminum 144 are conveniently attached at 146 to opposed walls of adjacent teeth so that the strips form a smooth continuous surface with the ends of the rotor teeth or so that the strips are slightly, radially inward on an external toothed rotor or slightly, radially outward on an internal toothed rotor. The non-magnetic strips can be placed below the end tooth surface to facilitate attachment to the teeth or to allow slightly more cooling fluid to be moved about the rotor.

The specific location of the terminating surface of the filling or strip material between the limits of completely closing the opening, flush with the tooth end, or slightly below the tooth end, as shown in Figure 3, or grooving the material, is governed by the amount of water required to be circulated. It will be noted, however, that all of the arrangements disclosed, fill or almost fill the surface between adjacent teeth and remove the objectionable feature of allowing large cavities to trap water, producing the undesirable results heretofore mentioned.

Figure 4 shows a modification of the device wherein the pole carrying rotor member has interdigitated type pole teeth which are circumferentially spaced and axially offset. The problem here is the same as in the structure already described and the solution is approched in the same manner.

The spaces between the interdigitated teeth 250, 252 are filled with a suitable non-magnetic material 248 so that the peripheral surface of the pole teeth and the non-magnetic material offer a smooth, continuous, arcuate surface. Again, as in the structure already disclosed, the surface portion of the non-magnetic material can be grooved or be formed very slightly below the surface portion of the pole teeth to insure clearance between the non-magnetic material and the armature member and to provide for carrying a small additional amount of water circumferentially for cooling purposes.

Figure 6:
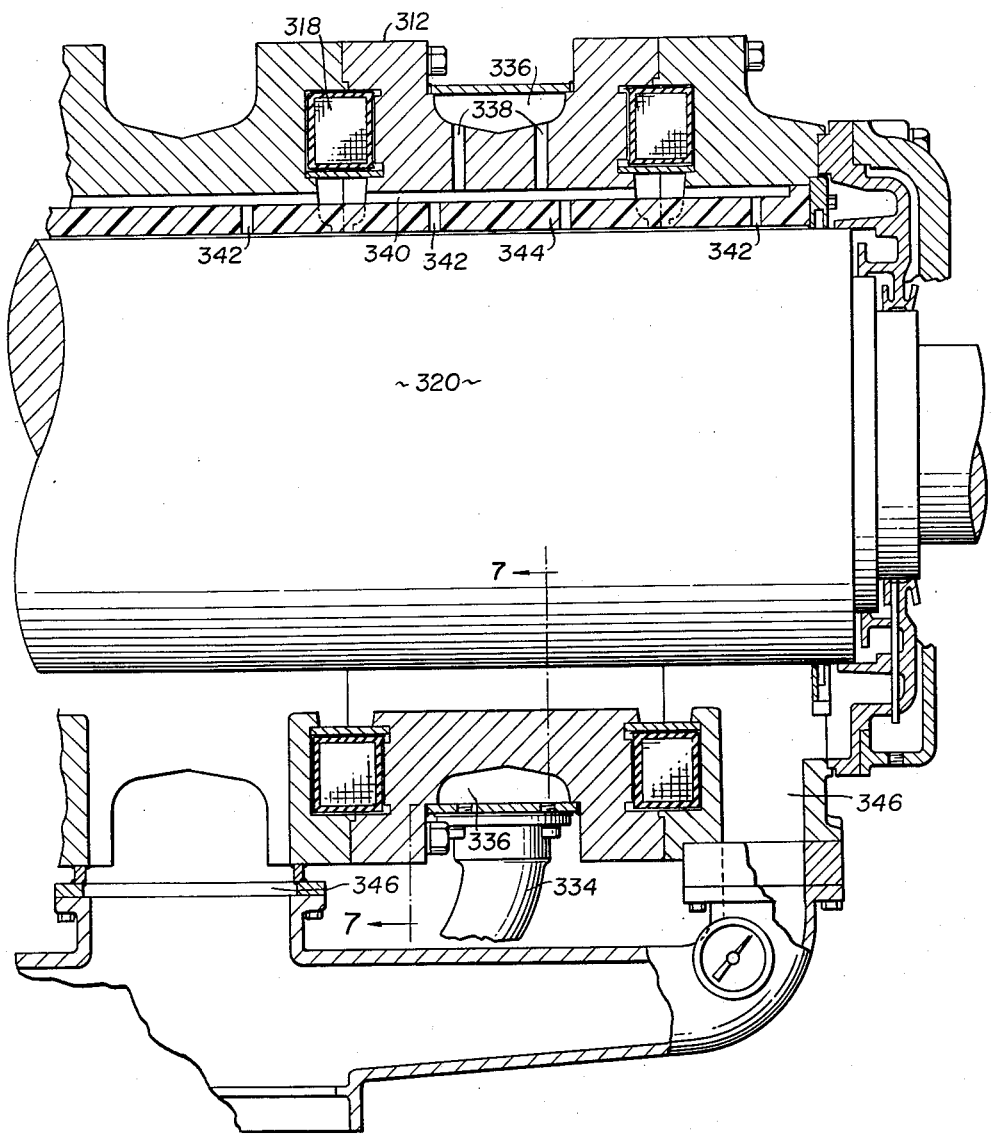

The structure in Figures 6 and 7 illustrates an eddy current type, liquid cooled dynamometer in which a further modification of the invention is embodied.

A dynamometer rotor member 320 is rotatably mounted by conventional bearing means in housing 312. Coils 318 are mounted in housing 312 and toothed pole members 326 are fixed to the housing.

The cooling liquid is fed through a flexible external pipe 334 to the circumferential manifold 336 and through holes 338 to the space 340 between the pole teeth 326.

The space between the pole teeth is partially filled leaving an axially extending void portion 340. The non-magnetic filling material is provided with axially spaced, radially directed holes 342 which provide a communication between the unfilled space 340 and the peripheral surface of the rotor.

When the coolant reaches the space 340, it passes through the holes 342 onto the rotor member and is discharged through the openings 346 at the bottom of the housing.

This arrangement provides a novel and effective means of insuring even distribution of the liquid coolant throughout the surface of the rotor and of the pole members. It also offers all of the advantages of the modifications heretofore mentioned. The filling material 344 can also be arranged in strips as shown in Figure 3 and provided with suitable axially spaced holes in the filling material to provide for passage of cooling liquid through the holes and onto the surface of the rotor.

It is to be understood that this invention can be applied to axially directed interdigitated type pole teeth which are disposed either radially inward or radially outward of the armature member and to gear type poled members which are of either the internal or the external type. Also, the invention is applicable to either a clutching device, as shown, a braking device in which either the pole carrying member or the armature member is rotatably fixed, or a dynamometer in which either the pole carrying member or the armature member is mounted for a limited amount of rotative movement.

It is to be understood that the filling or strip material operates most efficiently when the rotor surface is very smooth and is a continuous surface.

While the present invention has been described in connection with certain specific embodiments, it is to be understood that the foregoing description is merely exemplary and that the concept of this invention is susceptible of numerous other modifications, variations and applications which will be apparent to persons skilled in the art. The invention is to be limited therefore only by the broad scope of the appended claims.

What I claim is:

1. An eddy current dynamometer comprising a rotor member, a pole carrying member mounted for limited rotation and having axially extending, radially directed pole teeth spaced equidistantly from said rotor member, said pole teeth having spaces between said teeth, means provided in said spaces to form an arcuately smooth, continuous surface between adjacent pole teeth, said means being formed to provide a space between said means and the base of the said openings between said teeth and extending axially throughout the length of said teeth, said means being provided with axially spaced apertures which provide a communication between said rotor and said space adjacent said base of said openings, liquid coolant inlet means, further apertures providing communication between said space adjacent said base of said openings and said liquid coolant inlet means to provide for the passage of liquid coolant from said liquid coolant inlet means through said further apertures then through said apertures and onto the surface of said rotor member.

2. In a liquid cooled, eddy current dynamo-electric machine having relatively rotatable members and one of said members circumferentially encompassing the other of said members, said one member having circumferentially spaced axially extending, pole pieces mounted thereon, means interposed circumferentially between said pole pieces to form an arcuately smooth, continuous surface between adjacent pole pieces, said means being formed to provide a space between said means and a base portion of said openings between said teeth and extending axially throughout the length of said teeth, radially directed, axially spaced, circumferentially disposed openings in said means and a liquid cooling means passing through said openings onto the peripheral surface of the other of said relatively rotatable members.

3. In a liquid cooled eddy current device, a stationary frame portion, relatively rotatable members, one of said members fixed to said frame portion and having axially extending, radially directed pole teeth spaced equidistant from the other of said members, said other member being disposed radially inward of said one member, said pole teeth having spaces therebetween, said one member having non-magnetic material partially filling the spaces between said pole teeth and forming a smooth arcuate surface with the radial end of each of said pole teeth, said non-magnetic material having axially spaced openings which provide for the passage of liquid coolant from the unfilled space between said teeth to said other member.

(References on following page)

References Cited in the file of this patent

UNITED STATES PATENTS

| | | |
|---|---|---|
| 2,119,819 | List | June 7, 1938 |
| 2,417,686 | Hugin | Mar. 18, 1947 |
| 2,419,837 | Hugin | Apr. 29, 1947 |
| 2,448,381 | Martin | Aug. 31, 1948 |
| 2,473,259 | Potts | June 14, 1949 |
| 2,521,535 | Potts | Sept. 5, 1950 |
| 2,724,064 | Kilner | Nov. 15, 1955 |

FOREIGN PATENTS

| | | |
|---|---|---|
| 895,448 | France | Apr. 3, 1944 |